US011526807B2

(12) United States Patent
Xu et al.

(10) Patent No.: US 11,526,807 B2
(45) Date of Patent: Dec. 13, 2022

(54) MACHINE LEARNING SYSTEMS AND METHODS WITH SOURCE-TARGET ADAPTATION

(71) Applicant: BEIJING DIDI INFINITY TECHNOLOGY AND DEVELOPMENT CO., LTD., Beijing (CN)

(72) Inventors: Pengfei Xu, Beijing (CN); Sicheng Zhao, Beijing (CN); Guangzhi Wang, Beijing (CN); Shanghang Zhang, Beijing (CN); Yang Gu, Beijing (CN); Yaxian Li, Beijing (CN); Zhichao Song, Beijing (CN); Runbo Hu, Beijing (CN); Hua Chai, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 341 days.

(21) Appl. No.: 16/826,084

(22) Filed: Mar. 20, 2020

(65) Prior Publication Data

US 2021/0295208 A1  Sep. 23, 2021

(51) Int. Cl.
*G06N 3/02* (2006.01)
*G06N 3/08* (2006.01)
*G06N 20/00* (2019.01)
*G06K 9/62* (2022.01)

(52) U.S. Cl.
CPC .......... *G06N 20/00* (2019.01); *G06K 9/6215* (2013.01); *G06K 9/6267* (2013.01)

(58) Field of Classification Search
USPC ...................................................... 706/1–60
See application file for complete search history.

(56) References Cited

U.S. PATENT DOCUMENTS

| 11,048,887 | B1* | 6/2021 | Gupta | G06F 40/30 |
|---|---|---|---|---|
| 2017/0220951 | A1* | 8/2017 | Chidlovskii | G06N 20/00 |
| 2017/0293836 | A1* | 10/2017 | Li | G06N 3/0445 |
| 2018/0174071 | A1* | 6/2018 | Bhatt | G06K 9/62 |
| 2020/0130177 | A1* | 4/2020 | Kolouri | B25J 9/163 |
| 2021/0256319 | A1* | 8/2021 | Dana | G06K 9/6265 |

FOREIGN PATENT DOCUMENTS

WO  WO-2020037313 A1 *  2/2020  ......... H04L 63/0861

\* cited by examiner

*Primary Examiner* — Marcellus J Augustin
(74) *Attorney, Agent, or Firm* — Bayes PLLC

(57) ABSTRACT

Embodiments of the disclosure provide systems and methods for domain adaptation between a plurality of source domains and a target domain. The artificial intelligence method includes receiving labeled data from the plurality of source domains and unlabeled data from the target domain. The method further includes separately training, by a processor, a plurality of source classifiers each corresponding to a source domain using the labeled data received from the respective source domains. The method also includes selecting a subset of the labeled data received from each source domain based on a similarity between the selected labeled data and the unlabeled data of the target domain. The method additionally includes refining, by the processor, each source classifier using the selected subset of the labeled data, and predicting labels of the unlabeled data using the refined source classifiers.

20 Claims, 5 Drawing Sheets

MACHINE LEARNING SYSTEMS AND METHODS WITH SOURCE-TARGET ADAPTATION

TECHNICAL FIELD

The present disclosure relates to machine learning systems and methods with domain adaptation, and more particularly to, machine learning systems and methods with multi-source distilling domain adaptation (MDDA).

BACKGROUND

Deep learning has been widely used. Whether the learning is effective largely relies on modeling of the learning network and the quality of training data used to train the learning network. One key element of the success training is the availability of large-scale labeled datasets. In many practical applications, only limited or even no training data is available. On one hand, objects in the real world have a long-tailed distribution and it is labor-intensive and expensive to obtain labeled data. On the other hand, visual data possess variance in nature, which fundamentally limits the scalability and applicability of supervised learning models for handling new scenarios with few labeled examples. In such cases, conventional deep learning approaches suffer from performance decay.

Directly transferring the learned models trained on labeled source domains to unlabeled tar-get domains may compensate for the scarcity of relevant training data in some extent. However, they often result in poor performance, because of the presence of domain shift. Domain adaptation (DA) and transfer learning methods were later developed to tackle the domain shift issue. For example, unsupervised DA (UDA) addresses such problems by establishing knowledge transfer from a labeled source domain to an unlabeled target domain, and by exploring domain-invariant structures and representations to bridge the gap.

Though these methods made certain progress on DA, most of them focus on the single-source single-target setting and fail to consider a more practical scenario in which there are multiple labeled source domains with different distributions. Application of the single-source single-target DA algorithms to the multi-source problems may lead to sub-optimal solutions. While very recently some attentions have been given to multi-source domain adaptation (MSDA) problems, most of the current approaches suffer from the various limitations. First, these methods sacrifice the discriminative property of the extracted features for the desired task learner in order to learn domain invariant features. Furthermore, they treat the multiple sources equally and fail to consider the different discrepancies among the different sources and target. Such treatment may lead to suboptimal performance when some sources are very different from the target. Moreover, they treat different samples from each source equally, without selecting (also referred to as "distilling") the source data based on the fact that different samples from the same source domain may have different similarities from the target. In addition, the methods also suffer from vanishing gradient problem when the domain classifier network can perfectly distinguish target representations from the source ones.

Embodiments of the disclosure address the above problems by providing machine learning methods and systems with the disclosed multi-source distilling domain adaptation (MDDA) algorithm.

SUMMARY

Embodiments of the disclosure provide an artificial intelligence method for domain adaptation between a plurality of source domains and a target domain. The artificial intelligence method includes receiving labeled data from the plurality of source domains and unlabeled data from the target domain. The method further includes separately training, by a processor, a plurality of source classifiers each corresponding to a source domain using the labeled data received from the respective source domains. The method also includes selecting a subset of the labeled data received from each source domain based on a similarity between the selected labeled data and the unlabeled data of the target domain. The method additionally includes refining, by the processor, each source classifier using the selected subset of the labeled data, and predicting labels of the unlabeled data using the refined source classifiers.

Embodiments of the disclosure also provide a system for domain adaptation between a plurality of source domains and a target domain. The system includes a communication interface configured to labeled data from the plurality of source domains and unlabeled data from the target domain. The system further includes at least one processor coupled to the communication interface. The at least one processor is configured to separately train a plurality of source classifiers each corresponding to a source domain using the labeled data received from the respective source domains, select a subset of the labeled data received from each source domain based on a similarity between the selected labeled data and the unlabeled data of the target domain, jointly refine the source classifiers using the selected subsets of labeled data from the plurality of source domains, and predict labels of the unlabeled data using the refined source classifiers.

Embodiments of the disclosure further provide a non-transitory computer-readable medium storing instructions that, when executed by one or more processors, cause the one or more processors to perform an artificial intelligence method for domain adaptation between a plurality of source domains and a target domain. The artificial intelligence method includes receiving labeled data from the plurality of source domains and unlabeled data from the target domain. The method further includes separately training a plurality of source classifiers each corresponding to a source domain using the labeled data received from the respective source domains. The method also includes selecting a subset of the labeled data received from each source domain based on a similarity between the selected labeled data and the unlabeled data of the target domain. The method additionally includes refining each source classifier using the selected subset of the labeled data, and predicting labels of the unlabeled data using the refined source classifiers.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
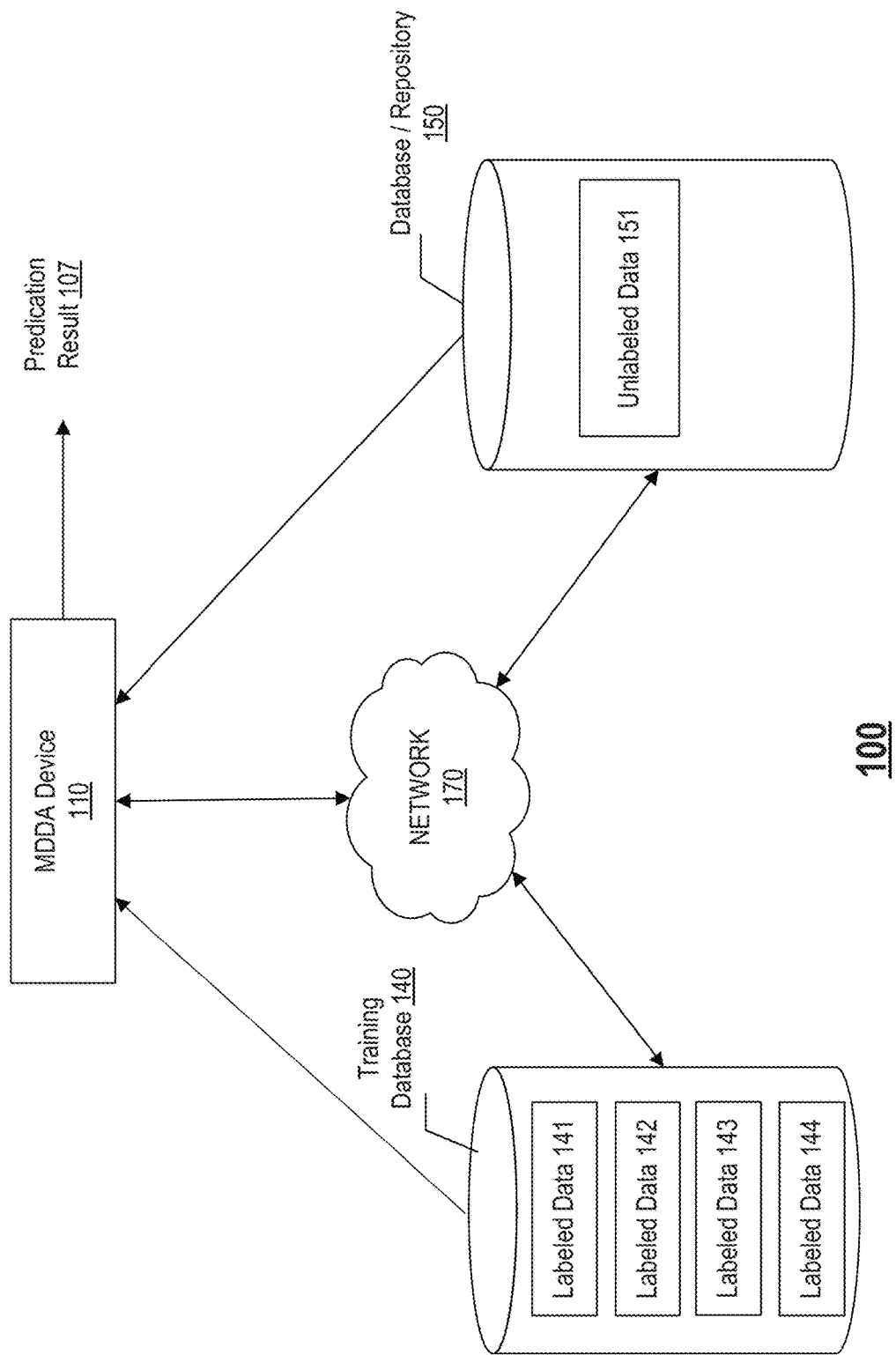
FIG. 1 illustrates a schematic diagram of an exemplary learning system, according to embodiments of the disclosure.
Figure 2:
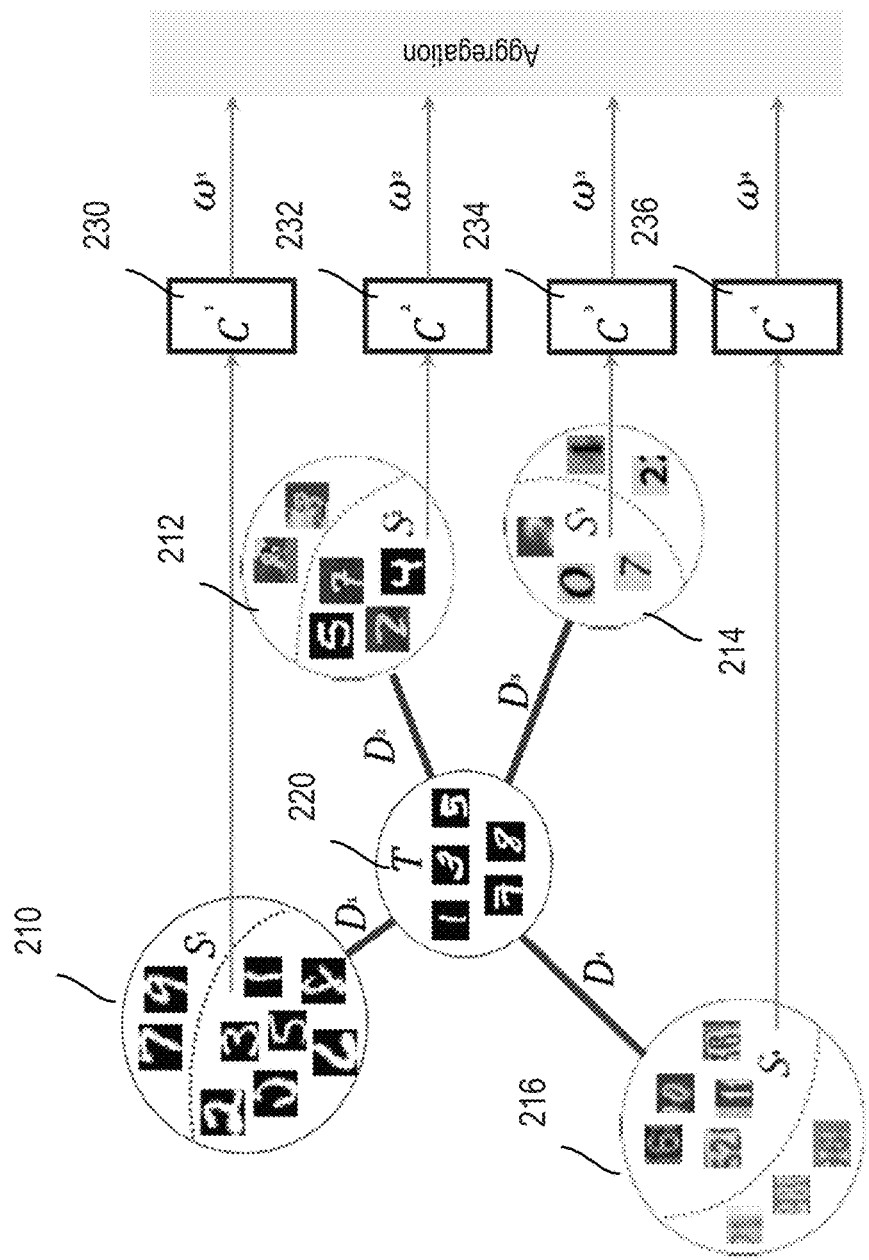
FIG. 2 illustrates an exemplary domain adaptation between multiple source domains and a target domain, according to embodiments of the disclosure.

FIG. 1 illustrates a schematic diagram of a learning system 100, according to embodiments of the disclosure. In some embodiments, learning system 100 may include components shown in FIG. 1, including an MDDA device 110, a training database 140, a database/repository 150, and a network 170 for facilitating communications among the various components. It is to be contemplated learning system 100 may include more or less components compared to those shown in FIG. 1. In some embodiments, learning system 100 is configured to perform learning with domain adaptation between multiple source domains and a target domain and provide prediction result 107. For example, FIG. 2 illustrates an exemplary domain adaptation between multiple source domains and a target domain, according to embodiments of the disclosure. FIG. 1 and FIG. 2 will be described together.

In some embodiments, training database 140 may store training data collected from multiple different source domains, e.g., including labeled data 141-144. For example, as shown in FIG. 2, labeled data 141-144 may be collected from source domains 210-216, respectively. In some embodiments, database/repository 150 may store unlabeled data 151 collected from a target domain. For example, as shown in FIG. 2, unlabeled data 151 may be collected from target domains 220.

In some embodiments, both the labeled data and the unlabeled data may be captured by one or more sensors (not shown). In some embodiments, the data may be images or visual image streams combined with corresponding audio descriptor streams, acquired by a camera, a wearable device, a smart phone, a tablet, a computer, or the like that includes an image or video recording device for acquiring the data. In some embodiments, the data may be point cloud data captured by a light detection and ranging (LiDAR) system. A LiDAR system measures the distance to a target by illuminating the target with pulsed laser light beams and measuring the reflected pulses with a sensor such as a photodetector or a photodetector array. Differences in laser light return times, wavelengths, and/or phases can then be used to construct digital three-dimensional (3D) representations of the target. In some embodiments, the data collected in the different source and target domains may be captured by different sensors, or the same sensor but with different settings.

The labeled data (e.g., labeled data 141-144) may include sample data each labeled with corresponding ground truth labels. The sample data and the corresponding ground truth labels may be stored in pairs in training database 140. For example, the labeled data may be images along with their ground truth recognition labels, as shown in FIG. 2. As another example, the labeled data may be autonomous driving sensor data along with their obstacle detection labels. In some embodiments, the ground truth labels may be assigned by operators during benchmark learning based on predetermined criteria/standards. Unlabeled data 151 are yet to be labeled. Consistent with the present disclosure, MDDA device 110 predicts labels for unlabeled data 151 (i.e., prediction result 107) based on the labeled data 141-144 provided by training database 140.

Consistent with some embodiments, MDDA device 110 may communicate with training database 140 to receive labeled data 141-144 and unlabeled data 151. In some embodiments, labeled data collected from source domains 210-216 and unlabeled data target domain 220 may follow different distributions or otherwise differ in characteristics. Consistent with the present disclosure, MDDA device 110 can perform learning on unlabeled data 151 that specifically compensate for the differences between the multiple source domains (e.g., source domains 210-216) and the target domain (e.g., target domain 220).

Consistent with some embodiments, MDDA device 110 may first pre-train the source classifiers $C_i$ separately using the training data from each source domain. MDDA device 110 then fixes the feature extractor of each source and adversarially maps the target into the feature space of each source respectively by minimizing a distance (e.g., an empirical Wasserstein distance) between the source and target. As shown in FIG. 2, the method employs a discriminator $D_i$ to measure the discrepancy between each source and target in an adversarial manner. Such an approach provides more stable gradients and promising generalization bound even when the target and source distributions are non-overlap. The disclosed MDDA learns more discriminative target representations and avoids the oscillation from the simultaneous changing of the multi-source and target distributions by using separate feature extractors that asymmetrically map the target to the feature space of the source in an adversarial manner. Next, MDDA device 110 selects the source training samples that are close to the target to finetune the source classifiers to obtain refined source classifiers 230-236 (denoted as $C'_i$) in respective source domains 210-216. As shown in FIG. 2, a subset of training samples in each source domain 210-216 that are closer to the unlabeled data in target domain 220 are selected. MDDA device 110 then applies refined source classifiers 230-236 on the selected source training samples to obtain source predictions. The source predictions are weighted by respective source domain weights co and then aggregated to obtain prediction result 107. In some embodiments, the weighting strategy may be designed to emphasize more relevant sources and suppress the irrelevant ones. For example, as shown in FIG. 2, the weights w correspond to the discrepancy between the sources and the target. The disclosed MDDA method can extract features that are both discriminative for the learning task and indiscriminate with respect to the shift among the multiple source and target domains.

In some embodiments, learning system 100 may optionally include network 170 to facilitate the communication among the various components of learning system 100, such as MDDA device 110 and databases 140 and 150. For example, network 170 may be a local area network (LAN), a wireless network, a cloud computing environment (e.g., software as a service, platform as a service, infrastructure as a service), a client-server, a wide area network (WAN), etc. In some embodiments, network 170 may be replaced by wired data communication systems or devices.

In some embodiments, the various components of learning system 100 may be remote from each other or in different locations and be connected through network 170 as shown in FIG. 1. In some alternative embodiments, certain components of learning system 100 may be located on the same site or inside one device. For example, training database 140 and/or database/repository 150 may be located on-site with or be part of MDDA device 110.

Figure 3:
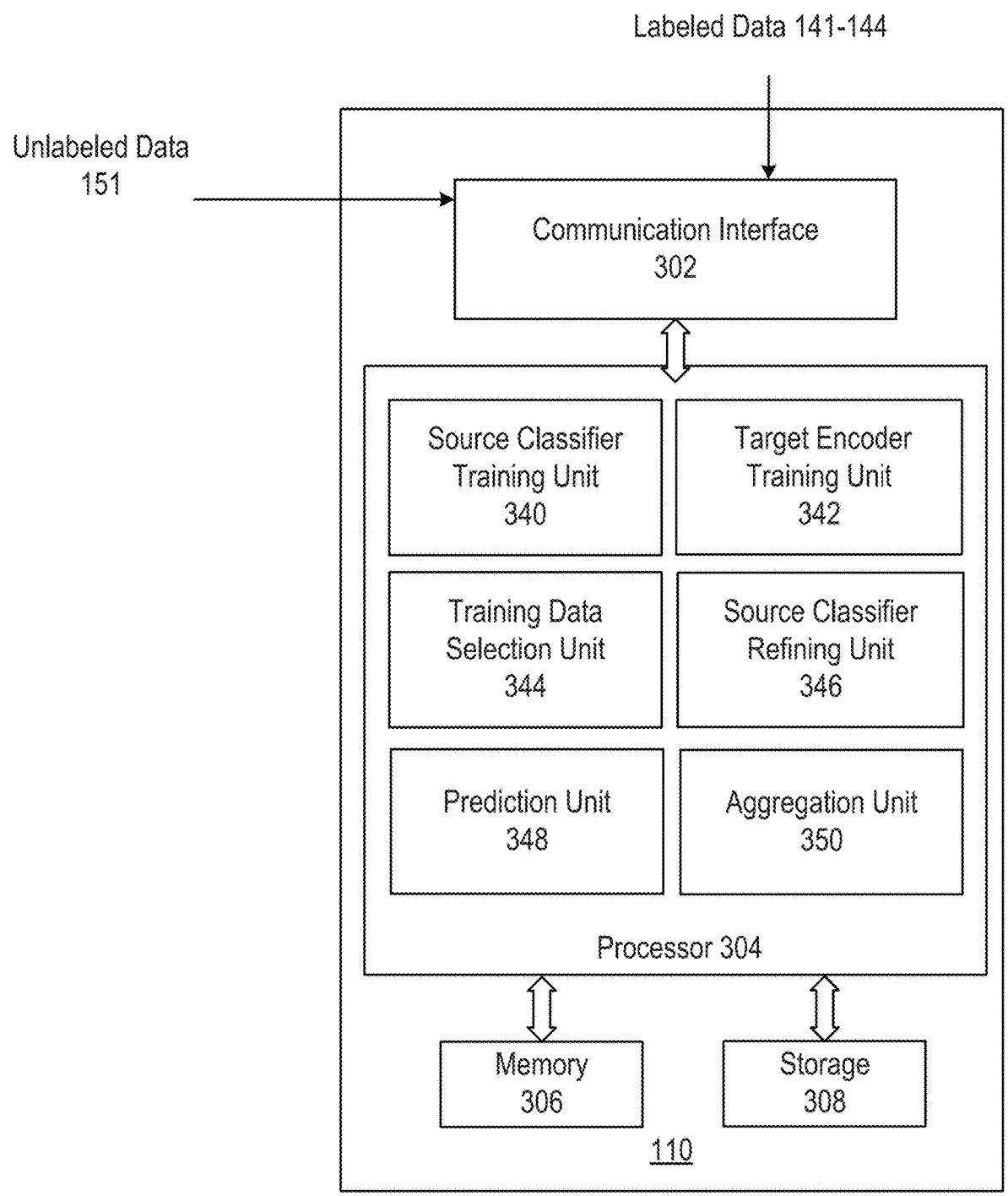
FIG. 3 illustrates a block diagram of an exemplary device for multi-source distilling domain adaptation, according to embodiments of the disclosure.

FIG. 3 illustrates a block diagram of an exemplary device for multi-source distilling domain adaptation (e.g., MDDA device 110 of FIG. 1), according to embodiments of the disclosure. In some embodiments, as shown in FIG. 3, MDDA device 110 may include a communication interface 302, a processor 304, a memory 306, and a storage 308. In some embodiments, MDDA device 110 may have different modules in a single device, such as an integrated circuit (IC) chip (e.g., implemented as an application-specific integrated circuit (ASIC) or a field-programmable gate array (FPGA)), or separate devices with dedicated functions. In some embodiments, one or more components of MDDA device 110 may be located in a cloud or may be alternatively in a single location (such as inside a mobile device) or distributed locations. Components of MDDA device 110 may be in an integrated device or distributed at different locations but communicate with each other through a network (not shown). Consistent with the president disclosure, MDDA device 110 may be configured to perform multi-source distilling domain adaptation learning on unlabeled data 151 based on labeled data 141-144 collected from multiple sources.

Communication interface 302 may send data to and receive data from components such as training database 140 and database/repository 150 via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 302 may include an integrated service digital network (ISDN) card, cable modem, satellite modem, or a modem to provide a data communication connection. As another example, communication interface 302 may include a local area network (LAN) card to provide a data communication connection to a compatible LAN. Wireless links can also be implemented by communication interface 302. In such an implementation, communication interface 302 can send and receive electrical, electromagnetic or optical signals that carry digital data streams representing various types of information.

Consistent with some embodiments, communication interface 302 may receive labeled data 141-144 from training database 140 and unlabeled data 151 from database/repository 150. Communication interface 302 may further provide the received data to memory 306 and/or storage 308 for storage or to processor 304 for processing.

Processor 304 may include any appropriate type of general-purpose or special-purpose microprocessor, digital signal processor, or microcontroller. Processor 304 may be configured as a separate processor module dedicated to MDDA learning. Alternatively, processor 304 may be configured as a shared processor module for performing other functions in addition to MDDA learning.

Memory 306 and storage 308 may include any appropriate type of mass storage provided to store any type of information that processor 304 may need to operate. Memory 306 and storage 308 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 306 and/or storage 308 may be configured to store one or more computer programs that may be executed by processor 304 to perform functions disclosed herein. For example, memory 306 and/or storage 308 may be configured to store program(s) that may be executed by processor 304 to performing MDDA learning.

In some embodiments, memory 306 and/or storage 308 may also store various learning models including their model parameters, such as the pre-trained source classifiers, refined source classified, feature extractors, target encoders, discriminators, etc. Memory 306 and/or storage 308 may also store intermediate data such as the source features extracted from the labeled data, target features extracted from the unlabeled data, mapped features, calculated distances between the multiple sources and the target, calculated source domain weights, etc.

As shown in FIG. 3, processor 304 may include multiple modules, such as a source classifier training unit 340, a target encoder training unit 342, a training data selection unit 344, a source classifier refining unit 346, a prediction unit 348, and an aggregation unit 350, and the like. These modules (and any corresponding sub-modules or sub-units) can be hardware units (e.g., portions of an integrated circuit) of processor 304 designed for use with other components or software units implemented by processor 304 through executing at least part of a program. The program may be stored on a computer-readable medium, and when executed by processor 304, it may perform one or more functions. Although FIG. 3 shows units 340-350 all within one processor 304, it is contemplated that these units may be distributed among different processors located closely or remotely with each other. For example, units 340-346 may be part of a training device while units 348-350 may be part of a separate learning device.

Figure 4:
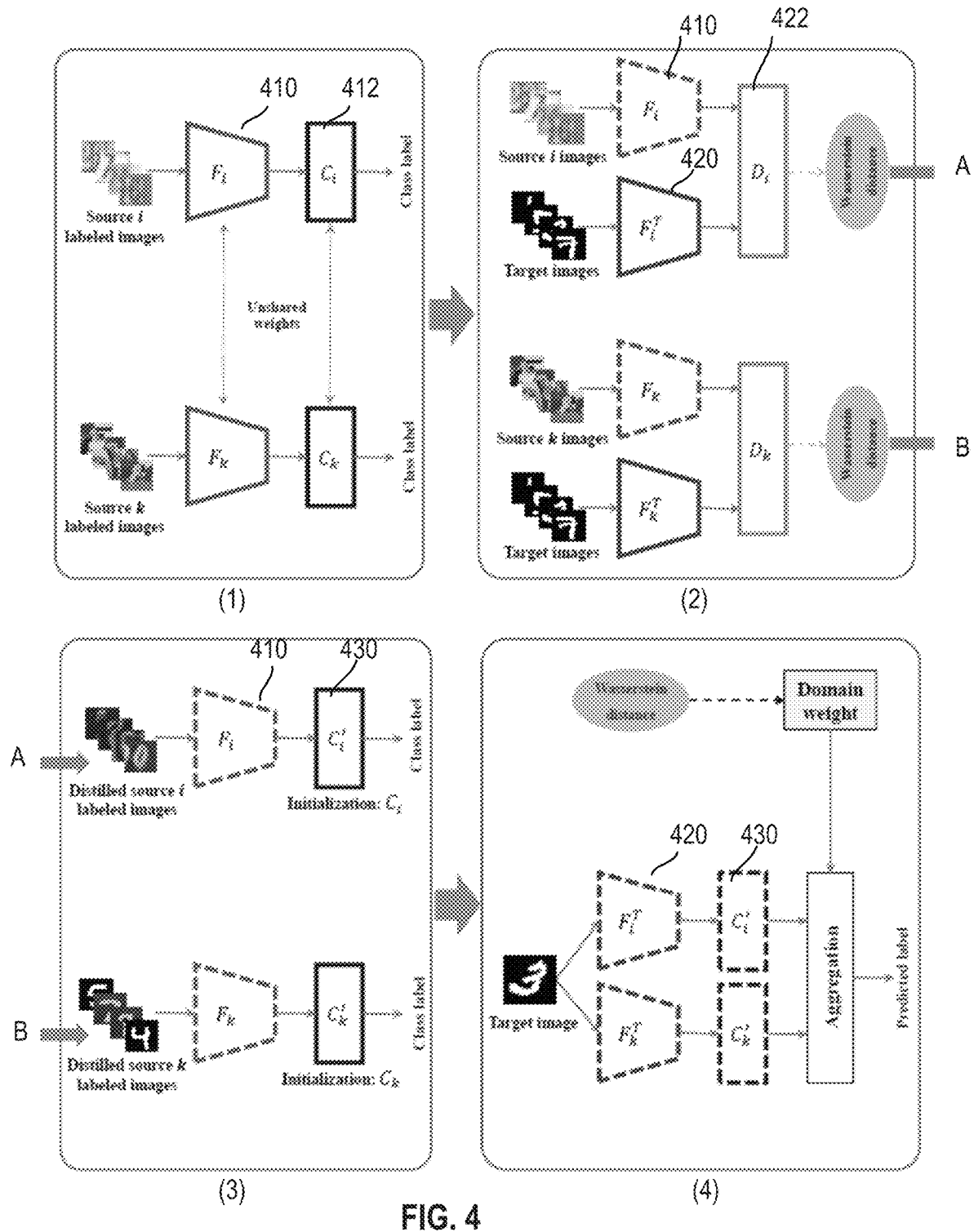
FIG. 4 illustrates a schematic diagram of the exemplary multi-source distilling domain adaptation framework, according to embodiments of the disclosure.
Figure 5:
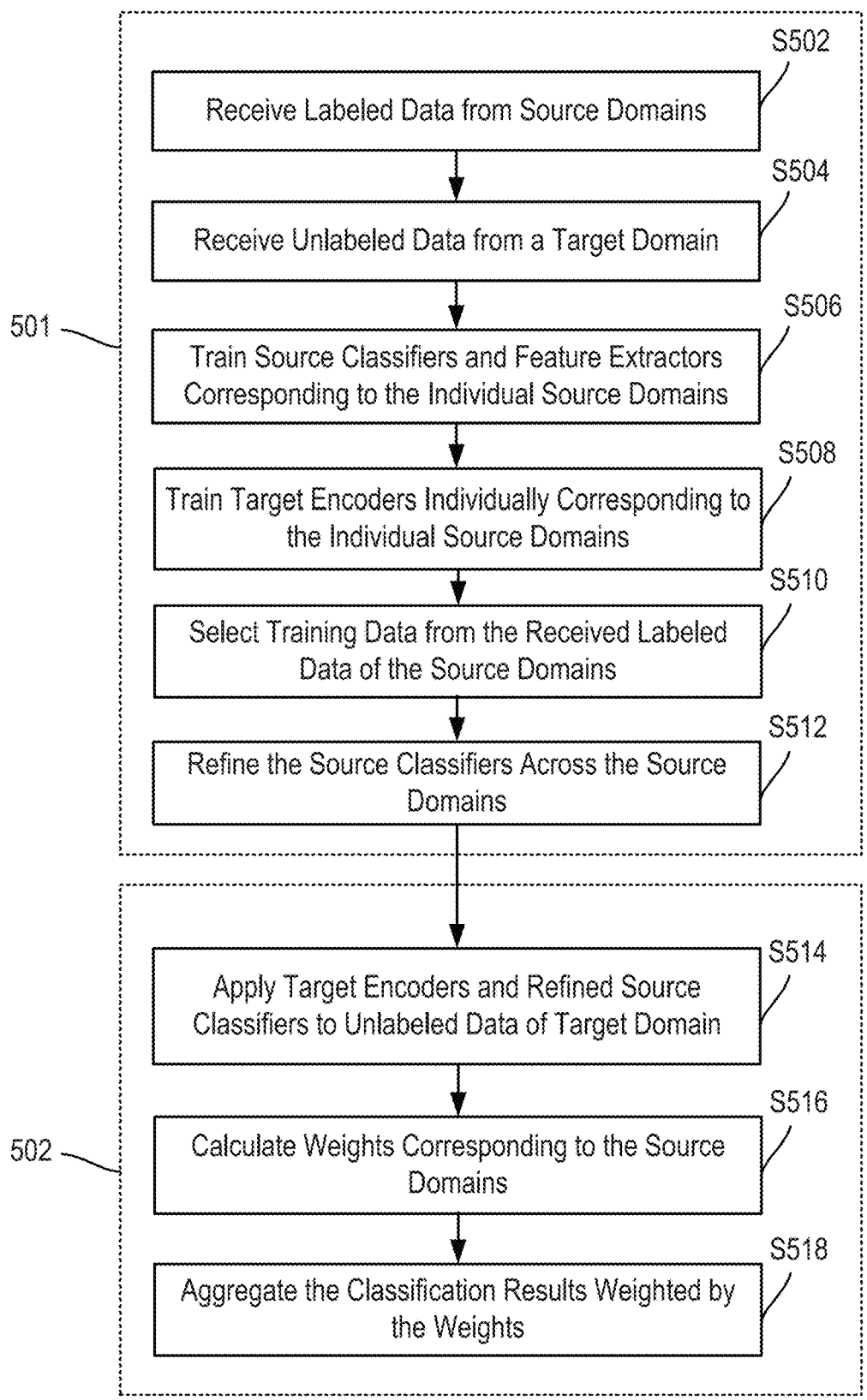
FIG. 5 illustrates a flowchart of an exemplary learning method with multi-source distilling domain adaption, according to embodiments of the disclosure.

In some embodiments, units 340-350 of FIG. 3 may execute computer instructions to perform the MDDA learning. For example, FIG. 4 illustrates a schematic diagram of the exemplary multi-source distilling domain adaptation framework 400, according to embodiments of the disclosure. FIG. 5 illustrates a flowchart of an exemplary learning method 500 with multi-source distilling domain adaption, according to embodiments of the disclosure. Learning method 500 may implement MDDA framework 400. Learning method 500 may be performed by MDDA device 110 and particularly processor 304 or a separate processor not shown in FIG. 3. Method 500 may include steps S502-S518 as described below. It is to be appreciated that some of the steps may be optional, and some of the steps may be performed simultaneously, or in a different order than shown in FIG. 3. FIGS. 3-5 will be described together.

In some embodiments, method 500 may include two stages: a training stage 501 and a learning stage 502. Training stage 501 may include steps S502-S512 to "train" the various learning models later used for predicting labels of unlabeled data 151 by learning stage 502. As used herein, "training" a learning model refers to determining one or more parameters of at least one layer in the learning model. The models trained by training stage 501 may include source-specific feature extractors 410, target encoders 420, discriminators 422, and/or source classifiers 430. In some embodiments, training stage 501 utilize both labeled data 141-144 collected from the different source domains and unlabeled data 151 collected from the target domain, in order to effectively account for the domain shift among the multiple source and target domains. Learning stage 502 may include steps S514-S518 to learn (or predict) the labels for unlabeled data 151 using the models trained during training stage 501. In some embodiments, training stage 501 and learning stage 502 may be performed by a single device, such as MDDA device 110, or by separate training and learning devices.

In step S502, communication interface 302 may receive training data collected in different source domains, such as labeled data 141-144 stored in training database 140. In some embodiments, the source domains may be non-overlapping or minimally over-lapping among each other, such that the training data collected from the source domains are characteristically different. In step S504, communication interface 302 may further receive unlabeled data collected in a target domain, such as unlabeled data 151 stored in database/repository 150. The target domain may be non-overlapping or minimally over-lapping with any of the source domains.

For the purpose of description, suppose there are M source domains $S_1, S_2, \ldots, S_M$ and one target domain T. In unsupervised domain adaptation (UDA) scenario, data collected in $S_1, S_2, \ldots, S_M$ are labeled and data collected in T is fully unlabeled. For the $i^{th}$ source domain $S_i$, the sample $X_i=\{x_i^j\}_{j=1}^{N_i}$ data $Y_i=\{y_i^j\}_{j=1}^{N_i}$ (e.g., $\{x_T^j\}_{j=1}^{N_T}$ N observed images) and corresponding labels drawn from the source distribution $p_i(x, y)$ are and, where $N_i$ is the number of source data. The target data drawn from the target distribution $p_T(x, y)$ are $X_T$=without label observation, where $N_T$ is the number of target data.

In some embodiments, the data from different domains are homogeneous, i.e., observed in the same feature space but exhibit different distributions. In some embodiments, the data are a closed set, i.e., all the domains share their categories. The goal of the disclosed MDDA method is to learn an adaptation model that can correctly predict a sample from the target domain based on the labeled data from the multiple source domains $\{(X_i, Y_i)\}_{i=1, \ldots, M}$ and the unlabeled data from the target domain$\{X_T\}$. It is contemplated though the disclosed method can be easily extended to tackle heterogeneous DA by changing the network structure of the target feature extractor, open set DA by adding an "unknown" class, or category shift DA by reweighing the predictions of only those domains that contain the specified category.

In step S506, source classifier training unit 340 may pre-train feature extractors and source classifiers separately for the individual source domains using the training data from each source. For example, as shown in the first block of FIG. 4, source classifier training unit 340 may pre-train a feature extractor $F_i$ (410) and classifier $C_i$ (412) for each labeled source domain $S_i$ with unshared weights between different domains. In some embodiments, $F_i$ and $C_i$ are optimized by minimizing a cross-entropy loss as defined by equation (1):

$$\mathcal{L}_{cls}(F_i, C_i) = -\mathbb{E}_{(x_i, y_i) \sim p_i} \sum_{n=1}^{N} \mathbb{1}_{[n=y_i]} \log(\sigma(C_i(F_i(x_i)))) \quad (1)$$

where σ is a softmax function, and 1 is an indicator function. Comparing with a shared feature extractor network to extract domain-invariant features among different source domains, the unshared feature extractor network can obtain the discriminative feature representations and accurate classifiers for each source domain. Accordingly, the final target prediction aggregated from the multiple predictions based on the source classifier and matched target features can be improved.

In step S508, target encoder training unit 342 may pre-train the target encoders separately for the individual source domains. For example, as shown in the second block of FIG. 4, target encoder training unit 342 learns separate target encoders $F_i^T$ (420) to map the target feature into the same space of source $S_i$. In some embodiments, the training of target encoders 420 may be modeled as a two-player mini-max game. In some embodiment, for each source domain $S_i$, a discriminator $D_i$ (422) is trained adversarially to maximize a difference between the correctly classified encoded target features from $F_i^T$ and the encoded source feature from pre-trained $F_i$, while $F_i^T$ tries to maximize the probability of $D_i$ making a mistake, i.e. minimizing that difference. In some embodiments, the difference may be a Wasserstein distance. In some embodiments, the discriminators $\{D_i\}$ are all 1-Lipschitz and $D_i$ can be optimized by maximizing the Wasserstein distance as defined equation (2):

$$\mathcal{L}_{wd_D}(D_i) = \mathbb{E}_{x_i \sim p_i} D_i(F_i(x_i)) - \mathbb{E}_{x_T \sim p_T}[D_i(D_i(F_i^T(x_T)))] \quad (2)$$

while $F_i^T$ is obtained by minimizing the loss defined by equation (3):

$$\mathcal{L}_{wd_F}(F_i^T) = -\mathbb{E}_{x_T \sim p_T} D_i(F_i^T(x_T)) \quad (3)$$

In such a design, the target encoder $F_i^T$ tries to confuse the discriminator De by minimizing the by minimizing the Wasserstein distance between the encoded target features as the source ones.

In some embodiments, to enforce the Lipschitz constraint, a gradient penalty for the parameters of each discriminator $D_i$ may also be included in the loss, as defined by equation (4):

$$\mathcal{L}_{grad}(D_i) = (\|\nabla_{\hat{x}} D_i(\hat{x})\|_2 - 1)^2 \quad (4)$$

where is a feature set that contains not only the source and target features but also the random points along the straight line between source and target feature pairs. $D_i$ can then be optimized by maximizing a loss that balances the Wasserstein distance and the gradient penalty, as defined by equation (5):

$$\max_{\mathcal{D}} \mathcal{L}_{wd_D}(D_i) - \alpha \mathcal{L}_{grad}(D_i) \quad (5)$$

where α is a balancing coefficient, the value of which can be empirically set.

In step S510, training data selection unit 344 may select a subset of training data from the received labeled data of each source domain. This step is also referred to as source distilling, which selects more relevant training data to improve the performance of the source classifiers. In some embodiments, in each source domain, training data selection unit 344 selects the source training samples that are closer to the target, e.g., based on a divergence between source data and target data. In one example, the estimated Wasserstein distance can be utilized for the selection. In that implementation, for each source sample $x_i^j$ in the $i^{th}$ source domain, training data selection unit 344 calculates the Wasserstein distance between the source sample and the target domain as defined by equation (6):

$$\tau_i^j = \left\| D_i(F_i(x_i)) - \sum_{k=1}^{N_T} D_i(F_i^T(x_k)) \right\| \quad (6)$$

For each source sample, the calculated distance reflects its similarity to the target domain. The smaller the calculated distance is, the closer the source sample is to the target domain. In some embodiments, in each source domain $S_i$, a predetermined percentage of source training samples may be selected. For example, the predetermined percentage may be ¼ (or 25%), ⅓ (or 33.3%), ½ (or 50%), ⅔ (or 66.7%), ¾ (or 75%), or any other proper percentage for the particular learning problem. For each source domain, the selected source training samples have their calculated distances smaller than any of the remaining, unselected, source training samples. For example, when the predetermined percentage is 50%, training data selection unit 344 selects $N_i/2$ out of a total of $N_i$ source training data whose Wasserstein distance is larger than the remaining ones in source domain $S_i$. In some embodiments, the predetermined percentage could vary among source domains depending on their individual similarity to the target domain. It is also contemplated that other selection criteria may be used. For example, instead of a predetermined percentage, training data selection unit 344 may select a predetermined number of source samples. As another example, training data selection unit 344 may select each source sample that has a calculated distance above a predetermined threshold value.

In step S512, source classifier refining unit 346 finetunes source classifiers $C_i$ (412) using the selected source training data. In some embodiments, unlike the pre-training of the source classifiers $C_i$ that is performed separately for each source domain, the refinement of the source classified can be performed across the source domains. For example, the source classifiers are finetuned by minimizing a joint objective function as defined by equation (7):

$$\mathcal{L}_{distill}(C_i) = -\mathbb{E}_{(\hat{x}_i, \hat{y}_i) \sim p_i} \sum_{n=1}^{N} \mathbb{1}_{[n=\hat{y}_i]} \log(\sigma(C_i(F_i(\hat{x}_i)))) \quad (7)$$

which aggregates losses from all the source domains.

As shown in the third block of FIG. 4, source classifier refining unit 346 uses the pre-trained source classifiers $C_i$ (412) as initialization of the refinement process, and optimizes them into source classifiers $C'_i$ (430).

In step S514, prediction unit 348 may apply the trained target encoders and the refined classifiers to unlabeled data of the target domain, e.g., unlabeled data 151 stored in database/repository 150. For example, the refined source classifiers $C'_i$ (430) and target encoders $F_i^T$ (420) are provided for the learning task (e.g., to classify a target data $x_T$), as illustrated by the fourth block of FIG. 4. For each source domain, prediction unit 348 extracts the features of the unlabeled target domain data based on the learned target encoder $F_i^T(x_T)$, and obtains source-specific prediction using the distilled source classifier $C'_i(F_i^T(x_T))$.

In step S516, aggregation unit 348 may determine weights for the different source domains in order to aggregate the source-specific prediction results. In some embodiments, the weights $\omega_i$ are determined based on the discrepancy between each source domain and the target domain to emphasize more relevant sources and suppress the less relevant ones. For example, assuming after training, the estimated Wasserstein distance between each source domain $S_i$ and target domain T follows a standard Gaussian Distribution N(0, 1), aggregation unit 348 may calculate the weight $\omega_i$ of each source domain according to equation (8):

$$\omega_i = e^{\frac{-L^2_{wdD_i}}{2}} \quad (8)$$

In step S518, aggregation unit 348 may then aggregate the source-specific predication results with the calculated weights. For example, the predictions from the source classifiers can be aggregated according to equation (9) to obtain the final label prediction (prediction result 107):

$$\text{Result}(x_T) = \sum_{i=1}^{N} \omega_i C'_i(F_i^T(x_T)) \quad (9)$$

The disclosed MDDA method and system thoroughly explore the relationships among different sources and target, and achieve more accurate inference on the target by fine-tuning and aggregating the source classifiers based these relationships. Compared to existing approaches, which symmetrically map the multiple sources and target into the same space, the disclosed MDDA learns more discriminative target representations and avoids the oscillation from the simultaneous changing of the multi-source and target distributions by using separate feature extractors that asymmetrically map the target to the feature space of the source in an adversarial manner. In some embodiments, Wasserstein distance is used in the adversarial training to achieve more stable gradients even when the target and source distributions are non-overlap. Source distilling mechanism is utilized to select the source training samples that are closer to the target and finetune the source classifiers with these samples. A novel weighting strategy is incorporated to automatically choose different weights for the source domains that emphasize more relevant sources and suppress the irrelevant ones. The multiple source classifiers are then aggregated based on these weights to build a more accurate target predictor.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

For the purpose of description, the embodiments are described in the context of a classification learning problem, where a label is leaned to indicate a category any data should be classified to. Therefore, the disclosure uses terms such as classifier, labeled data, unlabeled data, etc. However, it is contemplated that the disclosed system and method can be adapted to solve other type of learning problems. Accordingly, classifier may be replaced with another learning model. It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. An artificial intelligence method for domain adaptation between a plurality of source domains and a target domain, the artificial intelligence method comprising:
   receiving labeled data from the plurality of source domains and unlabeled data from the target domain;
   separately training, by a processor, a plurality of source classifiers each corresponding to a source domain using the labeled data received from the respective source domains;
   selecting a subset of the labeled data received from each source domain based on a similarity between the selected labeled data and the unlabeled data of the target domain;
   refining, by the processor, each source classifier using the selected subset of the labeled data; and
   predicting labels of the unlabeled data using the refined source classifiers.

2. The artificial intelligence method of claim 1, further comprising:
   separately training target encoders that map target features extracted from the unlabeled data to the respective source domains.

3. The artificial intelligence method of claim 2, wherein each target encoder is trained to optimizing a distance between the mapped target features and source features extracted from the labeled data of the respective source domain.

4. The artificial intelligence method of claim 3, wherein the similarity between the selected labeled data of the respective source domain and the target domain is determined by:
   mapping target features extracted from the unlabeled data to the respective source domain using the trained target encoders; and
   calculating the distance between the source features extracted from each unlabeled data of the respective source domain and the mapped target features.

5. The artificial intelligence method of claim 4, wherein the selected subset of the labeled data include a predetermined percentage of the labeled data received from the respective source domain, and the predetermined percentage of the labeled data are associated with calculated distances smaller than those of remaining labeled data.

6. The artificial intelligence method of claim 3, wherein the distance is a Wasserstein distance.

7. The artificial intelligence method of claim 3, wherein optimizing the distance is further balanced by a gradient penalty of a discriminator adversarily trained to counter the corresponding target encoder.

8. The artificial intelligence method of claim 1, wherein the learning network further comprises a plurality of feature extractors each corresponding a source domain, wherein the feature extractors extract features from the labeled data of the respective source domains, wherein the artificial intelligence method further comprises:
   jointly training each feature extractor with the source classifier corresponding to the same source domain using the labeled data received from that source domain.

9. The artificial intelligence method of claim 1, wherein jointly refining the source classifiers further comprises optimizing a cross-entropy loss determined using the selected subsets of labeled data from the plurality of source domains.

10. The artificial intelligence method of claim 1, wherein predicting labels of the unlabeled data using the refined source classifiers further comprises:
    performing predictions by applying the refined source classifiers to the unlabeled data of the target domain; and
    aggregating the predictions weighted by respective domain weights each corresponding to a source domain.

11. The artificial intelligence method of claim 10, wherein each domain weight is indicative of a discrepancy between the corresponding source domain and the target domain.

12. A system for domain adaptation between a plurality of source domains and a target domain, the system comprising:
    a communication interface configured to labeled data from the plurality of source domains and unlabeled data from the target domain; and
    at least one processor coupled to the communication interface and configured to:
       separately train a plurality of source classifiers each corresponding to a source domain using the labeled data received from the respective source domains;
       select a subset of the labeled data received from each source domain based on a similarity between the selected labeled data and the unlabeled data of the target domain;
       jointly refine the source classifiers using the selected subsets of labeled data from the plurality of source domains; and
       predict labels of the unlabeled data using the refined source classifiers.

13. The system of claim 12, wherein the at least one processor is further configured to:
    separately train target encoders that map target features extracted from the unlabeled data to the respective source domains, wherein each target encoder is trained to optimizing a distance between the mapped target features and source features extracted from the labeled data of the respective source domain.

14. The system of claim 13, wherein to determine the similarity between the selected labeled data of the respective source domain and the target domain, the at least one processor is further configured to:
    map target features extracted from the unlabeled data to the respective source domain using the trained target encoders; and
    calculate the distance between the source features extracted from each unlabeled data of the respective source domain and the mapped target features.

15. The system of claim 14, wherein the selected subset of the labeled data include a predetermined percentage of the labeled data received from the respective source domain, that the predetermined percentage of the labeled data are associated with calculated distances smaller than those of remaining labeled data.

16. The system of claim 13, wherein the distance is a Wasserstein distance.

17. The system of claim 12, wherein the learning network further comprises a plurality of feature extractors each corresponding a source domain, wherein the feature extractors extract features from the labeled data of the respective source domains, wherein the at least one processor is further configured to:
    jointly train each feature extractor with the source classifier corresponding to the same source domain using the labeled data received from that source domain.

18. The system of claim 12, wherein to jointly refine the source classifiers, the at least one processor is further configured to optimize a cross-entropy loss determined using the selected subsets of labeled data from the plurality of source domains.

19. The system of claim 12, wherein to predict labels of the unlabeled data using the refined source classifiers, the at least processor is further configured to:
 perform predictions by applying the refined source classifiers to the unlabeled data of the target domain; and
 aggregate the predictions weighted by respective domain weights each corresponding to a source domain, wherein each domain weight is indicative of a discrepancy between the corresponding source domain and the target domain.

20. A non-transitory computer-readable medium storing instructions that, when executed by a processor, cause the processor to perform an artificial intelligence method for domain adaptation between a plurality of source domains and a target domain, the artificial intelligence method comprising:
 receiving labeled data from the plurality of source domains and unlabeled data from the target domain;
 separately training a plurality of source classifiers each corresponding to a source domain using the labeled data received from the respective source domains;
 selecting a subset of the labeled data received from each source domain based on a similarity between the selected labeled data and the unlabeled data of the target domain;
 refining each source classifier using the selected subset of the labeled data; and
 predicting labels of the unlabeled data using the refined source classifiers.

\* \* \* \* \*